United States Patent
Kawada

(10) Patent No.: US 7,873,186 B2
(45) Date of Patent: Jan. 18, 2011

(54) TARGET-IMAGE DETECTING APPARATUS AND METHOD OF CONTROLLING SAME

(75) Inventor: Yukihiro Kawada, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 985 days.

(21) Appl. No.: 11/715,335

(22) Filed: Mar. 8, 2007

(65) Prior Publication Data

US 2007/0211918 A1 Sep. 13, 2007

(30) Foreign Application Priority Data

Mar. 10, 2006 (JP) .............................. 2006-065054

(51) Int. Cl.
*G06K 9/00* (2006.01)
(52) U.S. Cl. ........................ 382/103; 382/118; 382/181
(58) Field of Classification Search ................. 382/118, 382/181, 103
See application file for complete search history.

(56) References Cited

U.S. PATENT DOCUMENTS 7,050,607 B2 * 5/2006 Li et al. ...................... 382/118

2006/0120604 A1 * 6/2006 Kim et al. ................... 382/181

FOREIGN PATENT DOCUMENTS

| JP | 9-325092 A | 12/1997 |
|---|---|---|
| JP | 2001-216505 A | 8/2001 |
| JP | 2002-247436 A | 8/2002 |
| JP | 2004-320287 A | 11/2004 |

* cited by examiner

*Primary Examiner*—Tom Y Lu
(74) *Attorney, Agent, or Firm*—Birch, Stewart, Kolasch & Birch, LLP

(57) ABSTRACT

In the detection of face images, features for the purpose of detecting face images can be added on to supplement existing features. A face detecting apparatus includes a ROM, which stores data representing features for detecting face images having inclination angles at increments of 90° in the image of a subject. The face detecting apparatus is further provided with a connection terminal to which a flash ROM can be removably connected. The flash ROM stores data representing features for detecting face images having inclination angles finer than those of the images of the faces having inclination angles capable of being detected by the data representing the features that have been stored in the ROM. Face images can be detected more accurately by connecting the flash ROM to the face detecting apparatus.

11 Claims, 19 Drawing Sheets

*Fig. 2*

|   | FEATURE DATA | SCORE |
|---|---|---|
| 1 | PIXEL VALUE AT POSITION (x1,y1) IN SEARCH AREA | p_1 |
| 2 | PIXEL VALUE AT POSITION (x2,y2) IN SEARCH AREA | p_2 |
| : | : | : |
| i | PIXEL VALUE AT POSITION (x1,y1) IN SEARCH AREA IN CASE WHERE FILTER PROCESSING HAS BEEN APPLIED TO IMAGE IN SEARCH AREA | p_i |
| : | : | : |
| n | DIFFERENCE BETWEEN PIXEL VALUE AT POSITION (x1,y1) IN SEARCH AREA AND PIXEL VALUE AT POSIOTION (x2,y2) IN SEARCH AREA | p_n |

LEFT-ORIENTED
FACE IMAGE

RIGHT-ORIENTED
FACE IMAGE

Fig. 10

ROM

| FEATURE DATA OF IMAGE OF HUMAN FACE |
|---|
| FRONTAL: 0°, <br> FRONTAL: 90°, <br> FRONTAL: 180°, <br> FRONTAL: 270° |

Fig. 11

FLASH ROM

| FEATURE DATA OF IMAGE OF HUMAN FACE |
|---|
| FRONTAL: 30°, FRONTAL: 60°, FRONTAL: 120°, FRONTAL: 150°, FRONTAL: 210°, FRONTAL: 240°, FRONTAL: 300°, FRONTAL: 330°, <br> RIGHT SIDE: 0°, RIGHT SIDE: 30°, RIGHT SIDE: 60°, RIGHT SIDE: 90°, RIGHT SIDE: 120°, RIGHT SIDE: 150°, RIGHT SIDE: 180°, RIGHT SIDE: 210°, RIGHT SIDE: 240°, RIGHT SIDE: 270°, RIGHT SIDE: 300°, RIGHT SIDE: 330°, <br> LEFT SIDE: 0°, LEFT SIDE: 30°, LEFT SIDE: 60°, LEFT SIDE: 90°, LEFT SIDE: 120°, LEFT SIDE: 150°, LEFT SIDE: 180°, LEFT SIDE: 210°, LEFT SIDE: 240°, LEFT SIDE: 270°, LEFT SIDE: 300°, LEFT SIDE: 330° |

Fig. 12A
FLASH ROM

| FEATURE DATA OF IMAGE OF ANIMAL FACE |
|---|
| FRONTAL: 0°, FRONTAL: 30°, FRONTAL: 60°, FRONTAL: 90°, FRONTAL: 120°, FRONTAL: 150°, FRONTAL: 180°, FRONTAL: 210°, FRONTAL: 240°, FRONTAL: 270°, FRONTAL: 300°, FRONTAL: 330°, RIGHT SIDE: 0°, RIGHT SIDE: 30°, RIGHT SIDE: 60°, RIGHT SIDE: 90°, RIGHT SIDE: 120°, RIGHT SIDE: 150°, RIGHT SIDE: 180°, RIGHT SIDE: 210°, RIGHT SIDE: 240°, RIGHT SIDE: 270°, RIGHT SIDE: 300°, RIGHT SIDE: 330°, LEFT SIDE: 0°, LEFT SIDE: 30°, LEFT SIDE: 60°, LEFT SIDE: 90°, LEFT SIDE: 120°, LEFT SIDE: 150°, LEFT SIDE: 180°, LEFT SIDE: 210°, LEFT SIDE: 240°, LEFT SIDE: 270°, LEFT SIDE: 300°, LEFT SIDE: 330° |

Fig. 12B
FLASH ROM

| FEATURE DATA OF IMAGE OF FISH FACE |
|---|
| FRONTAL: 0°, FRONTAL: 30°, FRONTAL: 60°, FRONTAL: 90°, FRONTAL: 120°, FRONTAL: 150°, FRONTAL: 180°, FRONTAL: 210°, FRONTAL: 240°, FRONTAL: 270°, FRONTAL: 300°, FRONTAL: 330°, RIGHT SIDE: 0°, RIGHT SIDE: 30°, RIGHT SIDE: 60°, RIGHT SIDE: 90°, RIGHT SIDE: 120°, RIGHT SIDE: 150°, RIGHT SIDE: 180°, RIGHT SIDE: 210°, RIGHT SIDE: 240°, RIGHT SIDE: 270°, RIGHT SIDE: 300°, RIGHT SIDE: 330°, LEFT SIDE: 0°, LEFT SIDE: 30°, LEFT SIDE: 60°, LEFT SIDE: 90°, LEFT SIDE: 120°, LEFT SIDE: 150°, LEFT SIDE: 180°, LEFT SIDE: 210°, LEFT SIDE: 240°, LEFT SIDE: 270°, LEFT SIDE: 300°, LEFT SIDE: 330° |

TARGET-IMAGE DETECTING APPARATUS AND METHOD OF CONTROLLING SAME

BACKGROUND OF THE INVENTION

1. Field of the Invention

This invention relates to a target-image detecting apparatus and to a method of controlling this apparatus.

2. Description of the Related Art

Consideration has been given to the detection of a target image such as the image of a face from within the image of a subject. This enables the implementation of processing whereby the portion that is the detected face image takes on an appropriate brightness.

For example, data representing the features of a face is stored in a database beforehand and the image of the face is detected from within the image of a subject using the data representing the features stored in the database (see the specification of Japanese Patent Application Laid-Open No. 2001-216505).

In order to improve the accuracy of detection of a target image such as the image of a face, a large quantity of data representing features must be stored in the database. However, there is a limitation upon feature data capable of being stored in a database.

SUMMARY OF THE INVENTION

Accordingly, an object of the present invention is to so arrange it that data representing features can be added on.

According to the present invention, the foregoing object is attained by providing an apparatus for detecting a target image, comprising: a first memory for storing data representing a first feature utilized in order to detect a target image from within the image of a subject; a reading device (means) for reading data representing a second feature, which is utilized in order to detect the target image, from a second memory that stores the data representing the second feature; a first target-image detecting circuit for detecting the target image from within the image of the subject, which is applied thereto, using the data representing the first feature that has been stored in the first memory; and a second target-image detecting circuit for detecting the target image from within the image of the subject, which id applied thereto, using the data representing the second feature that has been read by the reading device.

The present invention also provides a control method suited to the above-described apparatus for detecting a target image. Specifically, there is provided a method of controlling an apparatus for detecting a target image, comprising the steps of: storing data, which represents a first feature utilized in order to detect a target image from within the image of a subject, in a first memory; reading data representing a second feature, which is utilized in order to detect the target image, from a second memory that stores the data representing the second feature; detecting the target image from within the applied image of the subject using the data representing the first feature that has been stored in the first memory; and detecting the target image from within the applied image of the subject using the data representing the second feature that has been read.

The first target-image detecting circuit and the second target-image detecting circuit may be made a common circuit or separate circuits.

In accordance with the present invention, data representing a first feature utilized in order to detect a target image (a face image, etc.) from within the image of a subject is stored in a first memory (which may or may not be rewritable). Processing for detecting the target image is executed using the data representing the first feature that has been stored in the first memory. The target-image detecting apparatus according to the present invention is further provided with a reading device [a connection terminal, an input device (means) or, in a case where data representing a second feature is transmitted, a receiving device (means)] for reading data representing a second feature from a second memory (which may or may not be rewritable). Processing for detecting the target image can be executed using also the data representing the second feature read from the second memory.

By way of example, a basic feature from among features utilized in detecting a target image is stored beforehand in the first memory, and an additional feature, such as one that improves target-image detection accuracy or one that enables detection of a more detailed target image, is stored in the second memory. In a target-image detecting apparatus considered to be an entry-level machine, it can be so arranged that a basic target image can be detected without connecting the second memory (i.e., without inputting data representing a second feature). In a target-image detecting apparatus considered to be a high-end machine, it can be so arranged that various target images can be detected upon connecting the second memory. Further, data representing a first feature utilized in order to detect a first target image (e.g., the image of a specific target other than a human being, an automobile, a building or the face of a human being) is stored in the first memory beforehand, and data representing a second feature utilized in order to detect a second target image (e.g., the image of a face other than that of a human being, e.g., the image of the face of an animal or a fish) different from the first target image can be stored in the second memory. The image of the face of a human being can be detected utilizing the data representing the first feature that has been stored in the first memory, and the image of a face other than that of a human being, e.g., the face of an animal or fish, can be detected utilizing the data representing the second feature that has been stored in the second memory.

It may be so arranged that in a case where the second memory is rewritable, the apparatus is further provided with a write control device (means) for writing the data representing the second feature to the second memory.

The apparatus may further comprise: a write mode setting device (means) capable of setting a first write mode in which data representing a feature of an image of a human face is written to the second memory as data representing the second feature, and a second write mode in which data representing a feature of an image of a specific target other than a human being is written to the second memory as data representing the second feature; and a feature-data input device (means) for inputting data representing the feature of the image of a human face and data representing the feature of the image of the specific target. In this case, the write control device, in response to setting of the first write mode by the write mode setting device, would write the data representing the feature of the image of a human face, which has been input from the feature-data input device, to the second memory, and in response to setting of the second write mode by the write mode setting device, would write the data representing the feature of the image of the specific target, which has been input from the feature-data input device, to the second memory. For example, the image of the face of a human being and the image of the face of an animal can be detected.

The second memory may be connected to the reading device.

By way of example, the first memory stores, as the first feature, data representing the features of images that include an upright image among images of faces from the front of a human being. By way of example, the second memory stores, as the second feature, data representing a feature of at least one image of an inclined image other than an upright image among images of faces from the front of a human being, and an image of a specific target other than a human being.

The apparatus may further comprise an image sensing device for sensing the image of a subject and outputting image data representing the image of the subject. In this case, the first target-image detecting circuit and the second target-image detecting circuit would detect the target image from within the image of a subject represented by image data that has been output from the image sensing device.

In a case where the second memory, which is rewritable, has been connected to the reading device, the apparatus may further comprise: a feature extracting device (means) for extracting a feature of the target image from the target image detected by the target-image detecting circuit; and a write control device (means) for writing data, which represents the feature extracted by the feature extracting device, to the second memory as data representing the second feature. Since the second memory is rewritable, the feature of a target image contained in the image of a subject obtained by imaging can be written to the second memory, and the feature that has been stored in the second memory can be updated.

In a case where the second memory, which is rewritable, has been connected to the reading device, the apparatus may further comprise: a reproducing circuit for reproducing the image of a subject; a feature extracting device (means) for extracting a feature of the target image from the target image contained in the image of the subject reproduced by the reproducing circuit; and a write control device (means) for writing data, which represents the feature extracted by the feature extracting device, to the second memory as data representing the second feature. By reproducing a desired subject image, the feature of a target image contained in the subject image can be written to the second memory. Since the feature of a specific target image (e.g., the image of a face regarding a specific person) can be written to the second memory, the accuracy at which the specific target image is detected can be improved.

In a case where the second memory, which is rewritable, has been connected to the reading device, the apparatus may further comprise: a feature-data input device (means) for inputting data representing the second feature; and a write control device (means) for writing data, which represents the second feature that has been input from the feature-data input device, to the second memory. For example, by connecting the target-image detecting apparatus and an external unit such as a personal computer or another target-image detecting apparatus in which data representing the second feature has been stored, and inputting the data representing the second feature stored in the connected external unit to the target-image detecting apparatus, the data representing the second feature stored in the external unit can be stored in the second memory. The data representing the second feature that has been stored in the second memory can be updated.

The first memory may store data representing the first feature, which is utilized to detect the image of a human face as the target image, and the second memory may be connected upon storing data representing the second feature, which is utilized in order to detect the image of a specific target other than a human being as the target image, in the reading device. In this case, the apparatus further comprises a detection mode setting device (means) for setting a mode in which the image of a human face is detected or a mode in which the image of a specific target other than a human being is detected. In response to setting by the detection mode setting device of the mode in which the image of a human face is detected, the first target-image detecting circuit would detect the image of human face from within the applied image of the subject using the data representing the first feature that has been stored in the first memory. In response to setting by the detection mode setting device of the detection mode in which the image of a specific target other than a human being is detected, the second target-image detecting circuit would detect the image of the specific target from within the applied image of the subject using the data representing the second feature that has been stored in the second memory. Thus, depending upon the detection mode that has been set, it is possible to detect the image of a human face or the image of the face of an animal or fish.

Other features and advantages of the present invention will be apparent from the following description taken in conjunction with the accompanying drawings, in which like reference characters designate the same or similar parts throughout the figures thereof;

BRIEF DESCRIPTION OF THE DRAWINGS

FIG. 2 illustrates feature data;

FIG. 10 illustrates an example of feature data of a human face stored in a ROM;

FIG. 11 illustrates an example of feature data of a human face stored in a flash ROM;

FIGS. 12A and 12B illustrate examples of feature data stored in a flash ROM;

DESCRIPTION OF THE PREFERRED EMBODIMENTS

Preferred embodiments of the present invention will now be described in detail with reference to the drawings.

The method of detecting of a image of a face will now be described.

Figure 1:
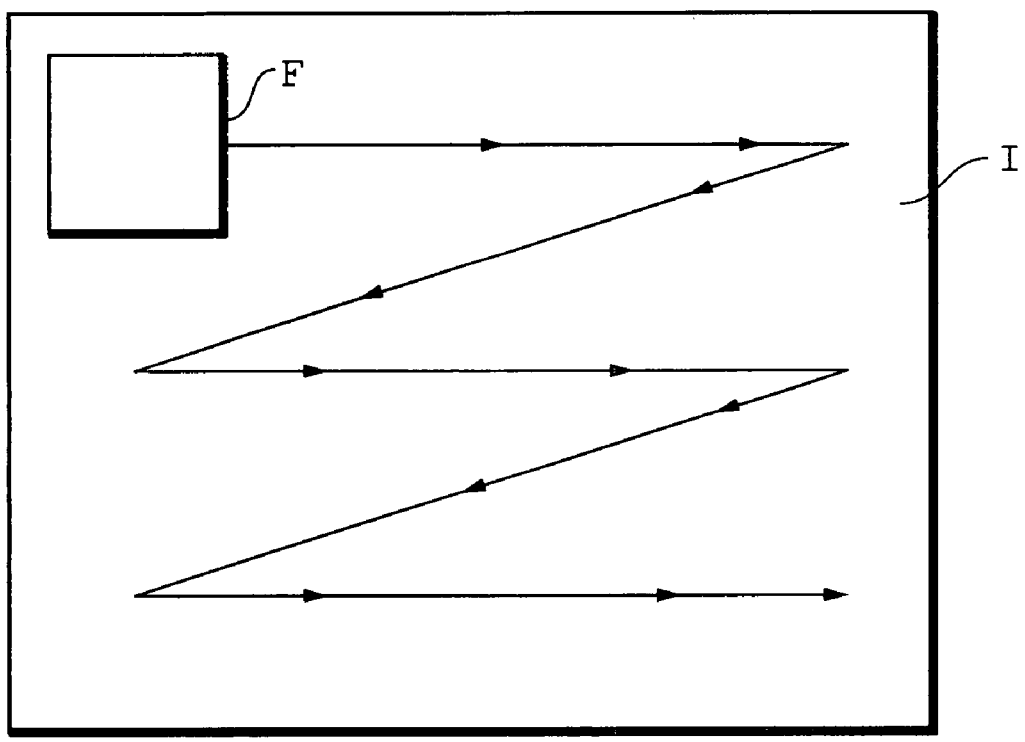
FIG. 1 illustrates the relationship between the image of a subject and a detection frame.

FIG. 1 illustrates an example of the image I of a subject. The image of a face is detected from within the subject image I. It goes without saying that the target image to be detected is not limited to the image of a face.

A search area F is defined on the subject image I. The search area F is moved incrementally a prescribed distance and scans the entirety of the subject image I. The image within the search area F and the feature of the face image are compared at each position to which the search area F is moved. In a case where the image within the search area F is the image of a face, the feature indicates the feature possessed by the image of the face. For example, a feature is whether a part of the image considered to be the image of an eye exists at a position where the eye is located, or whether a part of the image considered to be the image of a nose exists at a position where the nose is located.

Although the search area F in FIG. 1 is illustrated as a single area, search areas having different sizes are defined, the subject image I is scanned using the search areas of each of these sizes and the image of a face is detected.

FIG. 2 illustrates feature data and scores. Pixel values at prescribed positions within the search area, pixel values at prescribed positions within the search area in a case where filter processing has been applied to an image within the search area, and the differences between pixel values are defined as feature data. Scores are stipulated in correspondence with these feature data. For example, by adding the scores obtained from respective feature data, a value indicating the degree to which the image within the search area is face-like is obtained. If the value indicating this degree of facial likeliness is equal to or greater than a prescribed threshold value, then it is decided that the image within the search area is the image of a face.

Figure 3:
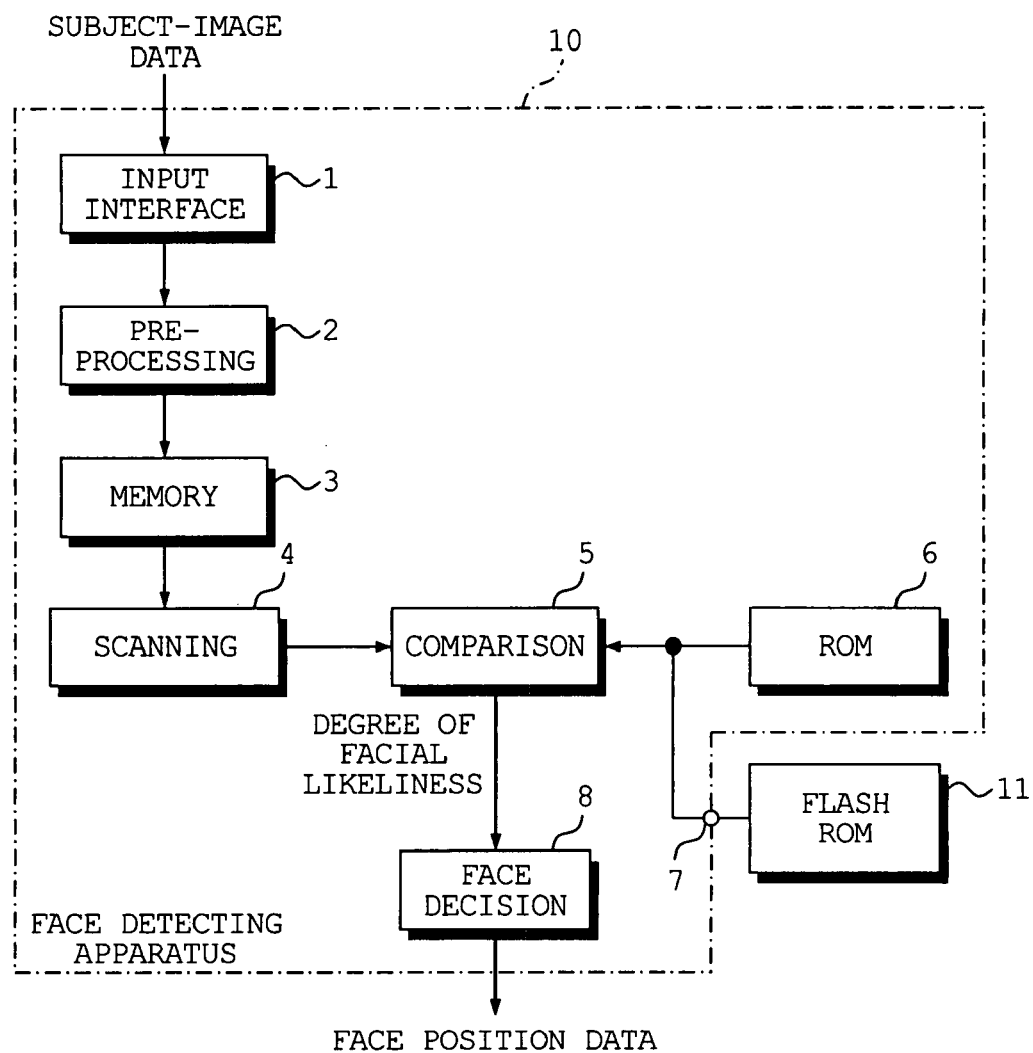
FIG. 3 is a block diagram illustrating the electrical structure of a face detecting apparatus.

FIG. 3 is a block diagram illustrating the electrical structure of a face detecting apparatus according to this embodiment.

Subject image data representing a subject image in which a face is to be detected is input to a face detecting apparatus 10 from an input interface 1. The entered subject image data is applied to a pre-processing circuit 2, where the data is subjected processing suited to face detection processing. The subject image data that has been output from the pre-processing circuit 2 is applied to an stored temporarily in a memory 3.

The subject image data is read out of the memory 3 and input to a scanning circuit 4. In the scanning circuit 4, in the manner described above, the search area F is moved incrementally a prescribed distance, and the image within the search area F is cut out. The image data representing the cut-out image within the search area F is input to a comparison circuit 5.

Figure 4:
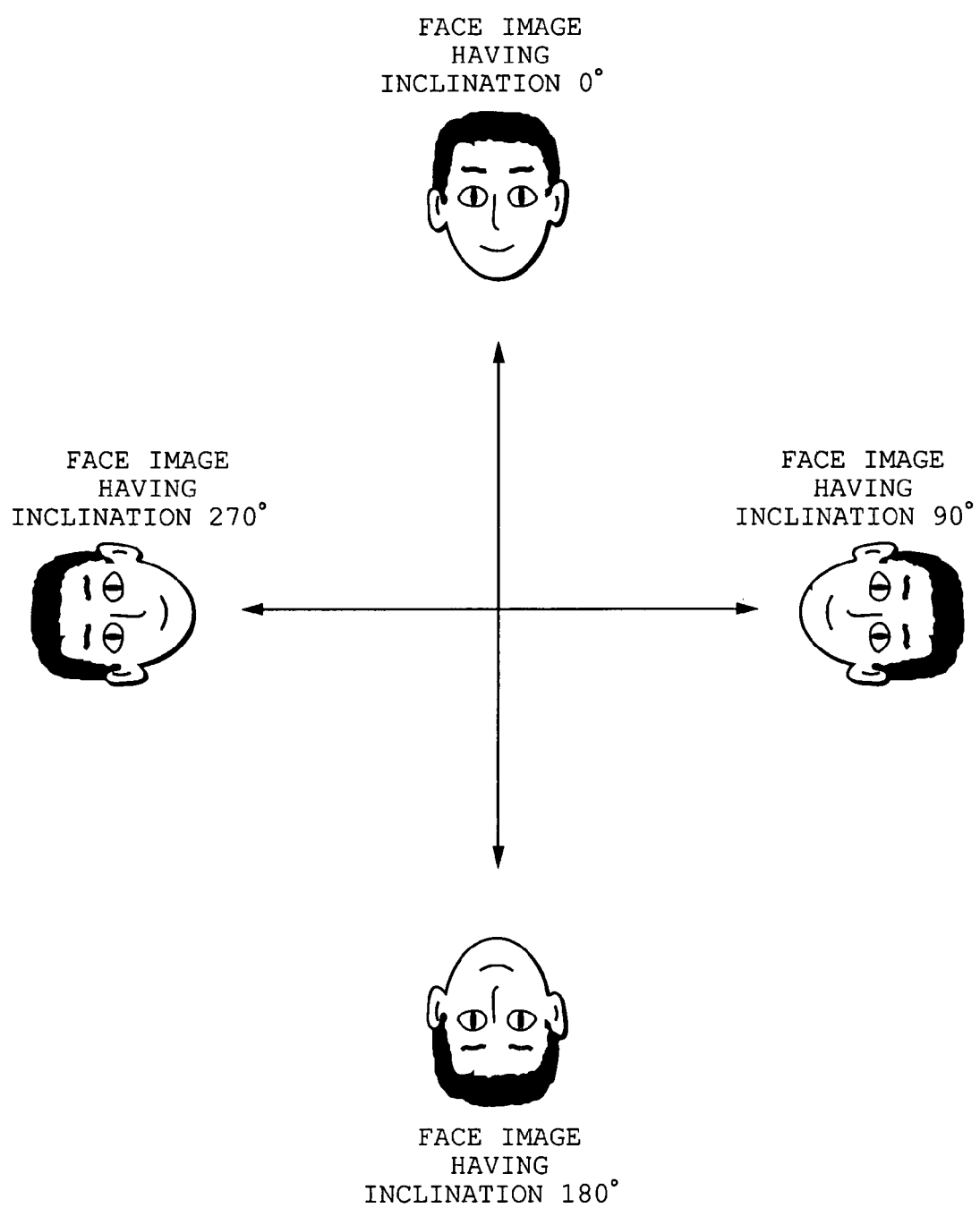
FIG. 4 illustrates examples of face images.

The face detecting apparatus 10 includes a ROM 6. Data representing basic features have been stored in the ROM 6. The basic features enable the detection of face images having inclination angles of 0°, 90°, 180° and 270° as seen from the front, as illustrated in FIG. 4. The data representing the basic features is read out of the ROM 6 and input to the comparison circuit 5.

The comparison circuit 5 compares the image data representing the cut-out image and the data representing the basic features and obtains data representing the degree of facial likeliness. The data representing the degree of facial likeliness is input to a face deciding circuit 8. If the data representing the degree of facial likeliness is equal to or greater than the prescribed threshold value, then the position of the search area prevailing when this data representing the degree of facial likeliness is obtained is output from the face deciding circuit 8 as data representing the position of the face. It goes without saying that the scanning circuit 4 outputs data representing the position of the search area F and applies this data to the face deciding circuit 8 via the comparison circuit 5.

Figure 5:
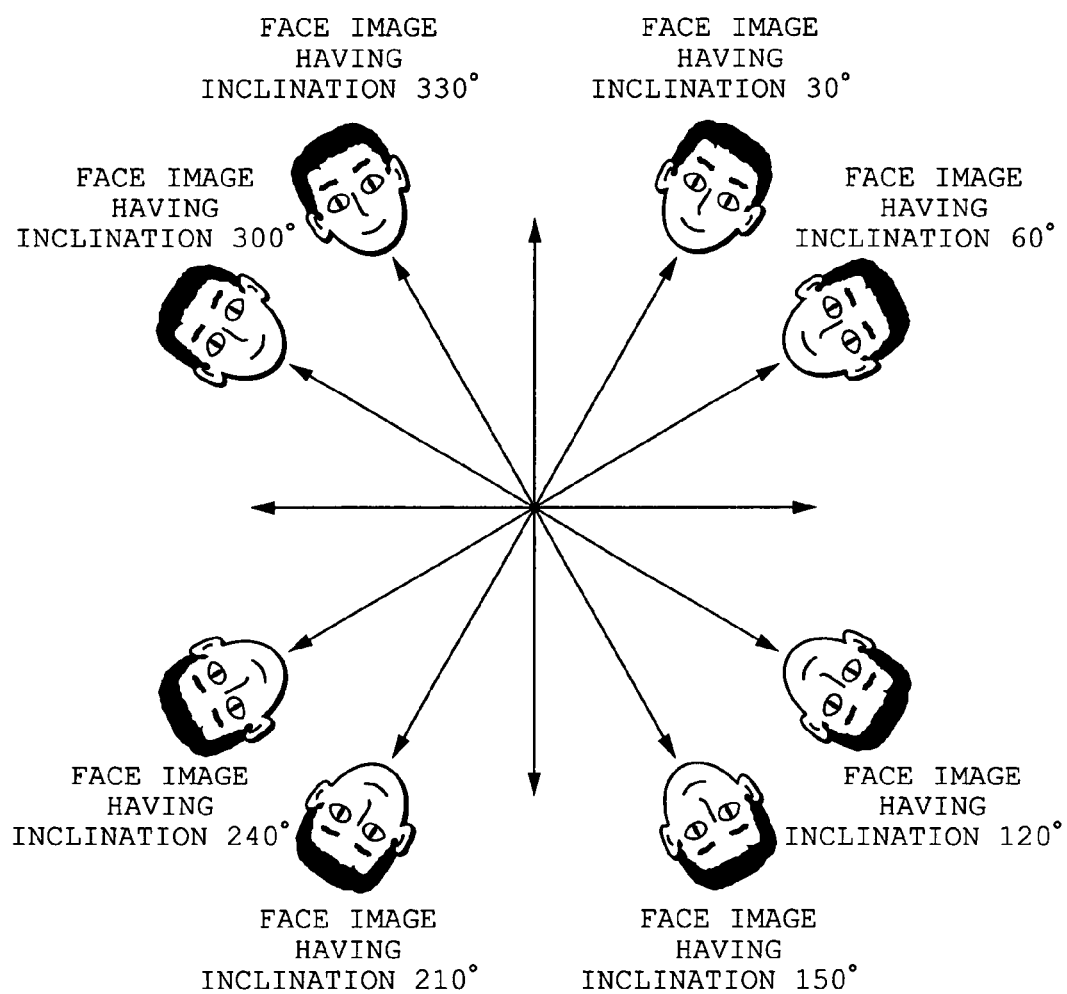
FIG. 5 illustrates examples of face images.
Figure 6A:
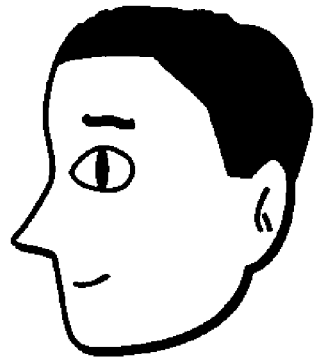
FIGS. 6A and 6B illustrate examples of face images.
Figure 6B:
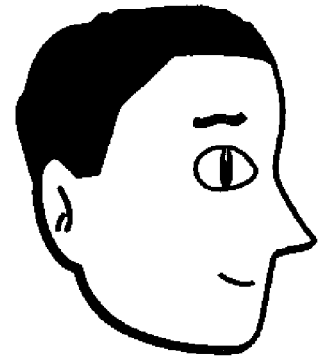

A flash ROM (a rewritable non-volatile memory) 11 has been connected to the face detecting apparatus 10 of this embodiment by a connection terminal 7. Data representing optional features have been stored in the flash ROM 11. The optional features enable the detection of face images having inclination angles of 30°, 60°, 120°, 150°, 210°, 240°, 300° and 330° as seen from the front, as illustrated in FIG. 5, as well as face images oriented to the left and right, as illustrated in FIGS. 6A and 6B. It will be understood that by reading the data representing the optional features out of the flash ROM 11 and applying this data to the comparison circuit 5, a face image having an inclination of, e.g., 30° will be detected in a manner similar to that of the face-image detection processing that is based upon the data representing the basic features.

Face-image detection accuracy can be changed depending upon whether or not the flash ROM 11 is attached. For example, if the apparatus that utilizes the face detecting apparatus 10 is a high-end machine, then it will suffice to utilize the face detecting apparatus 10 with the flash ROM 11 connected thereto. If the apparatus that utilizes the face detecting apparatus 10 is an entry-level machine, then it will suffice to utilize the face detecting apparatus 10 without the flash ROM 11 connected thereto. Further, since the flash ROM 11 is rewritable, the data representing the optional features can be rewritten or added to, thereby making it possible to further improve detection accuracy. The memory connected to the connection terminal 7 need only be a rewritable non-volatile memory and is not necessarily limited to the flash ROM 11. For example, the memory may be an EEPROM (Electrically Erasable Programmable Read-Only Memory). If necessary, a circuit for detecting whether the flash ROM 11 has been connected to the connection terminal 7 may be provided. Of course, a ROM that is not rewritable may be connected instead of the flash ROM 11. By previously checking the data representing the optional features in the ROM, the data representing the optional features can be read out of the ROM and face-detection processing can be executed in a manner similar to that described above.

Figure 7:
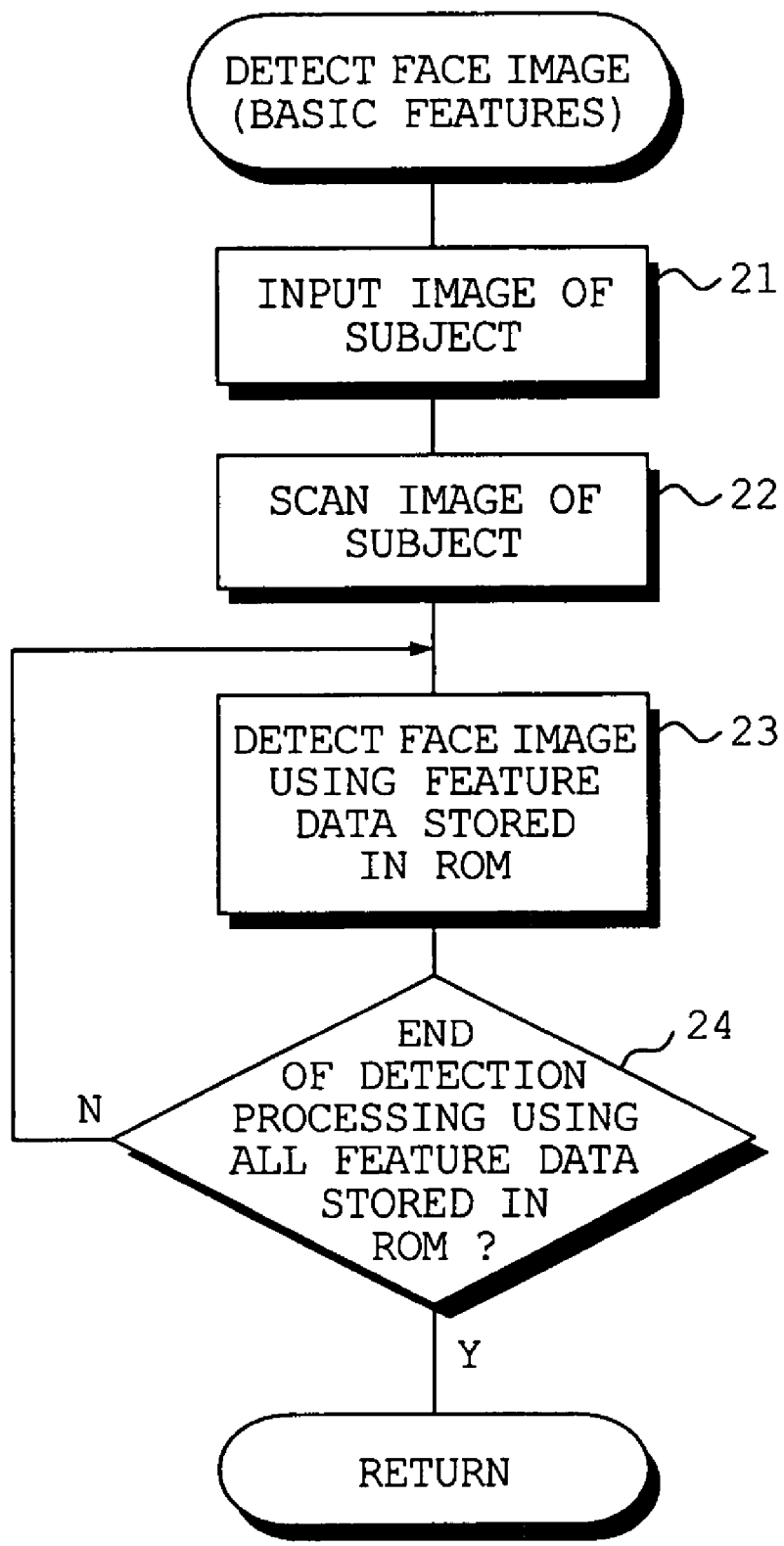
FIG. 7 is a flowchart illustrating processing for detecting a face image.

FIG. 7 is a flowchart illustrating processing for detecting the image of a face using data representing basic features.

As described above, subject image data representing the image of a subject is input to the face-image detecting apparatus (step 21) and the image of the subject is scanned by the search area F (step 22). Data representing basic features stored in the ROM 6 is read out and the face image is detected from within the image of the subject using the feature data read out (step 23). The face-image detection processing indicated at step 23 is repeated until detection processing using all basic features stored in the ROM 6 ends (step 24).

Since data representing basic features for detecting the images of faces having inclination angles of 0°, 90°, 180° and 270° as seen from the front have been stored in the ROM 6, as mentioned above, face images having inclination angles of 0°, 90°, 180° and 270° are detected by such face detection processing.

Figure 8:
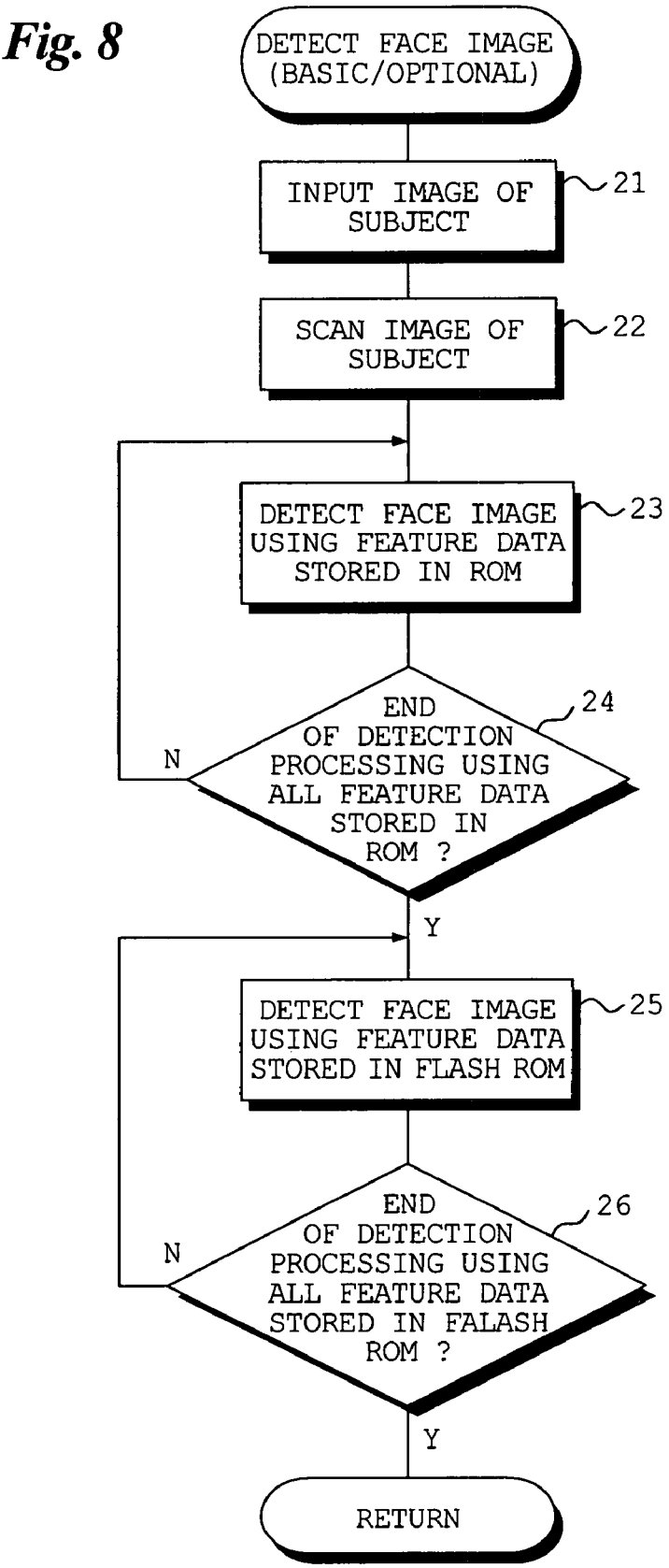
FIG. 8 is a flowchart illustrating processing for detecting a face image.

FIG. 8 is a flowchart illustrating processing for detecting a face image using data representing basic features and data representing optional features. Processing in FIG. 8 identical with that shown in FIG. 7 is designated by like step numbers and need not be described again.

When the processing for detecting a face image ends using the basic features in the manner set forth above (steps 21 to 24), data representing the optional features that have been stored in the flash ROM 11 is read out. Face-image detection processing is executed using the data representing the optional features read out (step 25). The processing of step 25 is repeated until face-image detection processing using data representing all features that have been stored in the flash ROM 11 ends (step 26).

Since data representing optional features for detecting the face images having inclination angles of 30°, 60°, 120°, 150°, 210°, 240°, 300° and 330° as seen from the front as well as face images oriented to the left and right have been stored in the flash ROM 11, as mentioned above, face images having inclination angles of 30°, 60°, 120°, 150°, 210°, 240°, 300° and 330° as seen from the front as well as face images oriented to the left and right are detected besides the face images having the inclination angles of 0°, 90°, 180° and 270° as seen from the front.

Figure 9:
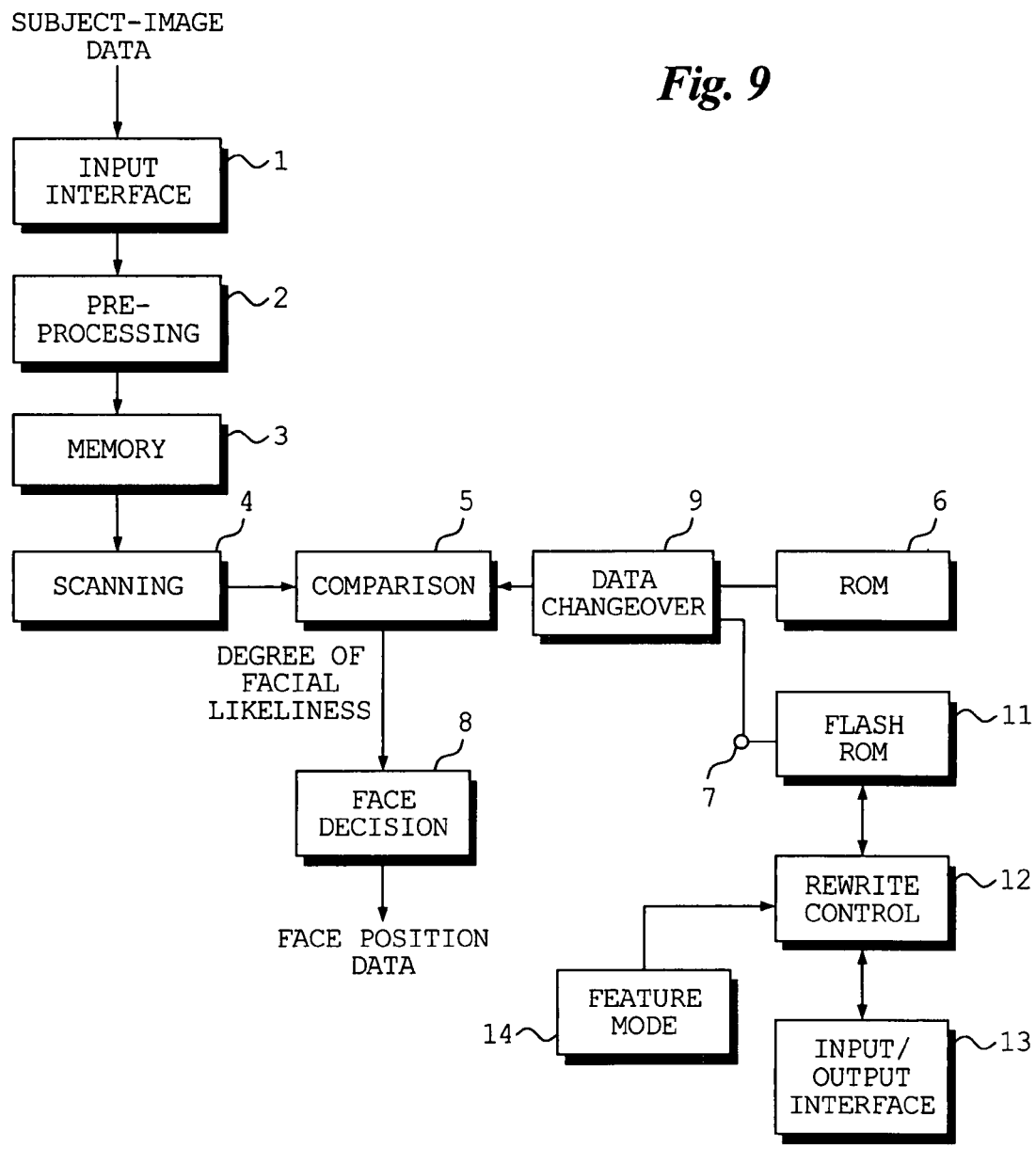
FIG. 9 is a block diagram illustrating the electrical structure of a face detecting apparatus.

FIG. 9 is a block diagram illustrating the electrical structure of a face detecting apparatus according to another embodiment of the present invention. Components in FIG. 9 identical with which shown in FIG. 1 are designated by like reference characters and they need not to be described again.

In the face detecting apparatus according to this embodiment, feature data can be written to the flash ROM 11 and optional feature data that has been stored in the flash ROM 11 can be rewritten. In order to accomplish this, the face detecting apparatus is provided with a rewrite control circuit 12 and an input/output interface 13. A data changeover circuit 9 is provided between the comparison circuit 5 and the ROM 6 and flash ROM 11. Read-out of basic feature data that has been stored in the ROM 6 and read-out of optional feature data that has been stored in the flash ROM 11 is switched between by the data changeover circuit 9. Among the feature data of a human face, those for detecting face images having inclination angles of 0°, 90°, 180° and 270° as seen from the front have been stored in the ROM 6, as illustrated in FIG. 10.

Optional feature data applied from outside the face detecting apparatus is applied to the rewrite control circuit 12 via the input/output interface 13. The optional feature data applied from outside the face detecting apparatus is written to the flash ROM 11.

In the face detecting apparatus according to this embodiment, a feature mode dial 14 also is provided. By using the feature mode dial 14, the type of data representing optional features to be written to the flash ROM 11 can be set, and it is possible to set read-out of optional feature data of a prescribed type from among the optional features that have been stored in the flash ROM 11. Modes for writing in features include, e.g., a mode for writing in optional features of a human face image, a mode for writing in optional features of face images of animals (dogs, cats, etc.) other than the face images of human beings, and a mode for writing in optional features of the face images of fishes. A signal indicating the write mode that has been set by the feature mode dial 14 is input to the rewrite control circuit 12. In accordance with the signal indicating the write mode, the flash ROM 11 is controlled by the rewrite control circuit 12 in such a manner that the storage location of the optional feature data that has been externally input to the face detecting apparatus will be different.

By way of example, if the mode for writing in the features of a human face is set by the feature mode dial 14, the externally applied feature data of a human face is written to a prescribed address of the flash ROM 11. As a result, data representing features of a human face image used in order to detect human face images having inclination angles of 30°, 60°, 120°, 150°, 210°, 240°, 300° and 330° as seen from the front as well as human face images having inclination angles at increments of 30° as seen from the right side and increments of 30° as seen from the left side is written to the flash ROM 11, as illustrated in FIG. 11, by way of example. Similarly, if the mode for writing in the features of an animal face is set by the feature mode dial 14, optional feature data used in order to detect animal face images having inclination angles at increments of 30° as seen from the front, animal face images having inclination angles at increments of 30° as seen from the right side and animal face images having inclination angles at increments of 30° as seen from the left side is written to a prescribed address of the flash ROM 11, as illustrated in FIG. 12A. Further, if the mode for writing in the features of the face of fishes is set by the feature mode dial 14, optional feature data used in order to detect fish face images having inclination angles at increments of 30° as seen from the front, fish face images having inclination angles at increments of 30° as seen from the right side and fish face images having inclination angles at increments of 30° as seen from the left side is written to a prescribed address of the flash ROM 11, as illustrated in FIG. 12B.

Figure 13:
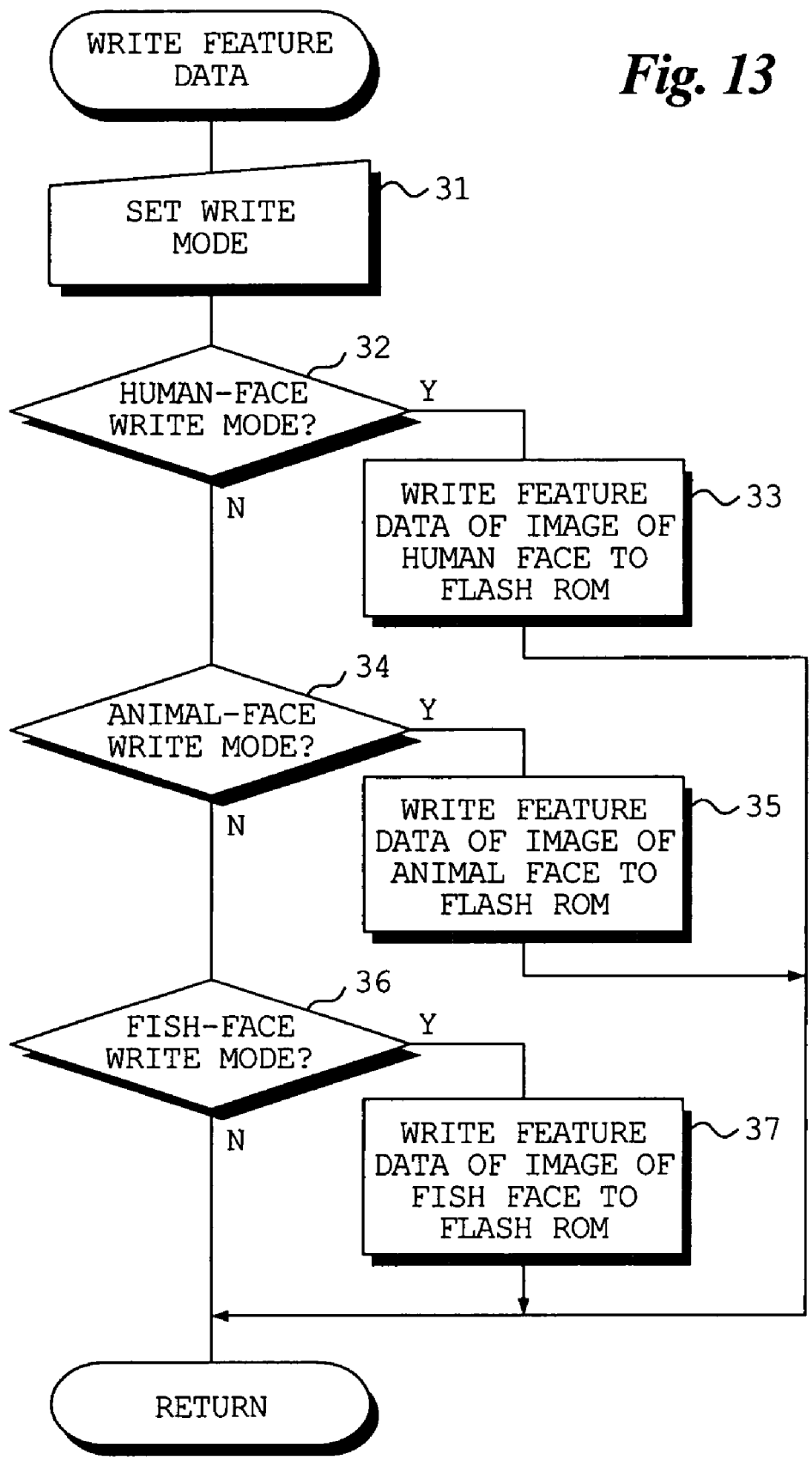
FIG. 13 is a flowchart illustrating processing for writing feature data.

FIG. 13 is a flowchart illustrating processing for writing optional features.

As described above, the write mode is set by the feature mode dial 14 (step 31). If the mode is set to the mode for writing in the features of a human face ("YES" at step 32), the feature data of the face of a human being is written to a prescribed address of the flash ROM 11 (step 33). If the mode is set to the mode for writing in the features of an animal face ("NO" at step 32, "YES" at step 34), then the feature data of the face of an animal is written to a prescribed address of the flash ROM 11 (step 35). If the mode is set to the mode for writing in the features of a fish face ("NO" at steps 32 and 34, "YES" at step 36), then the feature data of the face of a fish is written to a prescribed address of the flash ROM 11 (step 37).

Figure 14:
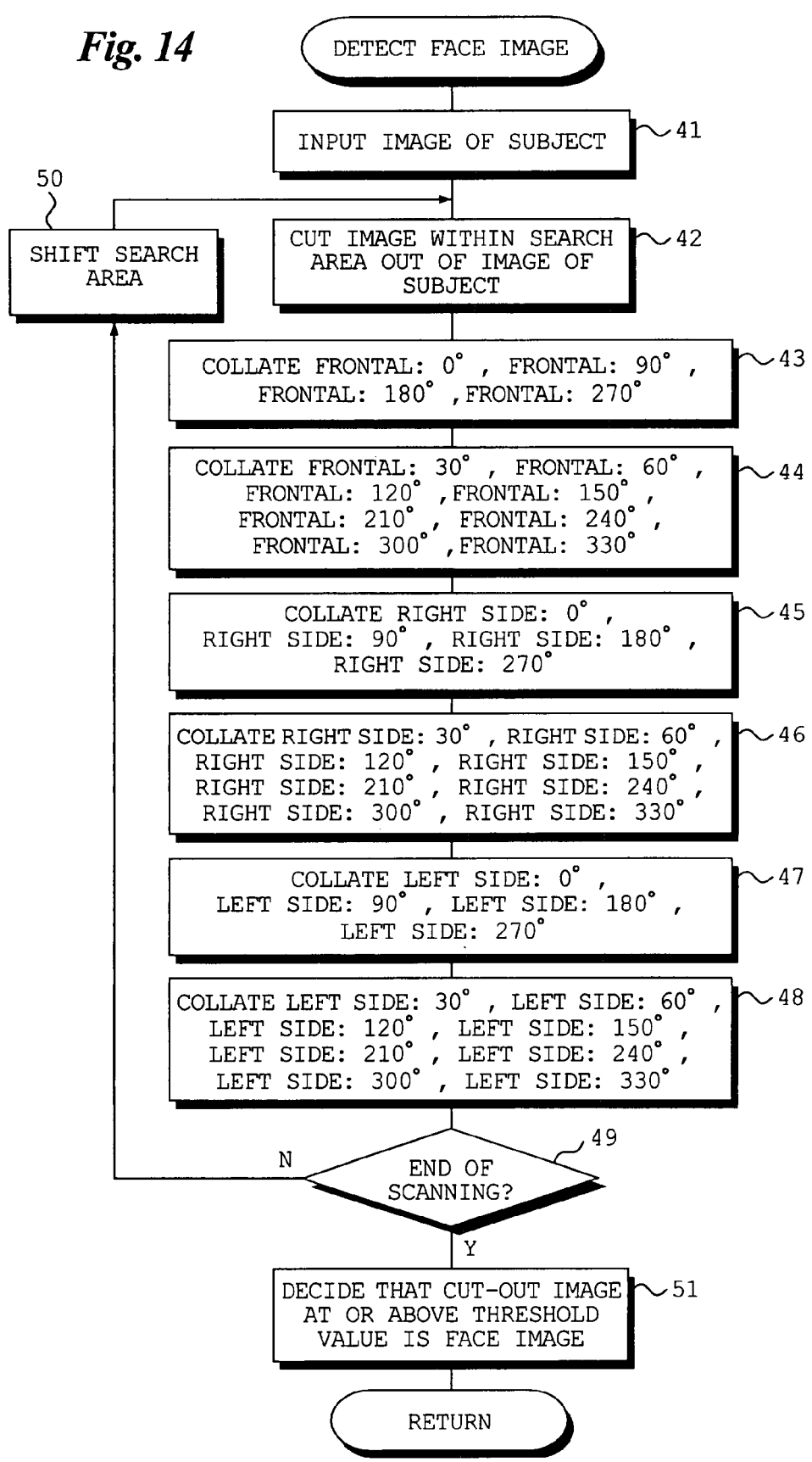
FIG. 14 is a flowchart illustrating processing for detecting a face image.

FIG. 14 is a flowchart illustrating processing for detecting a face image.

Subject image data representing the image of a subject is input to the face detecting apparatus (step 41). The image within the search area is cut out as described above (step 42).

The cut-out image is compared with the features represented by the feature data of 0°, 90°, 180° and 270° as seen from the front from among the feature data that has been stored in ROM 6 or flash ROM 11, and processing (collation) for calculating the degree of facial likeliness is executed (step 43). Next, the cut-out image is compared with the features represented by the feature data of 30°, 60°, 120°, 150°, 210°, 240°, 300° and 330° as seen from the front, and processing for calculating the degree of facial likeliness is executed (step 44). Similarly, processing for collating the cut-out image with features represented by the feature data of 0°, 90°, 180° and 270° as seen from the right side is executed (step 45), processing for collating the cut-out image with features represented by the feature data of 30°, 60°, 120°, 150°, 210°, 240°, 300° and 330° as seen from the right side is executed (step 46), processing for collating the cut-out image with features represented by the feature data of 0°, 90°, 180° and 270° as seen from the left side is executed (step 47), and processing for collating the cut-out image with features represented by the feature data of 30°, 60°, 120°, 150°, 210°, 240°, 300° and 330° as seen from the left side is executed (step 48).

The processing of steps 42 to 48 is repeated while shifting the search area (step 50) until the scanning of search area ends with regard to the entire image of the subject ("NO" at step 49).

The face images to be detected may be all of human, animal and fish face images, or it may be so arranged that a selection can be made from among humans, animals and fishes. In the case where the selection is made, it would be so arranged that the target (human, animal or fish) to undergo face detection is selected by the feature mode dial, and the feature data conforming to the selected target would be read out of the ROM 6 or flash ROM 11.

Figure 15:
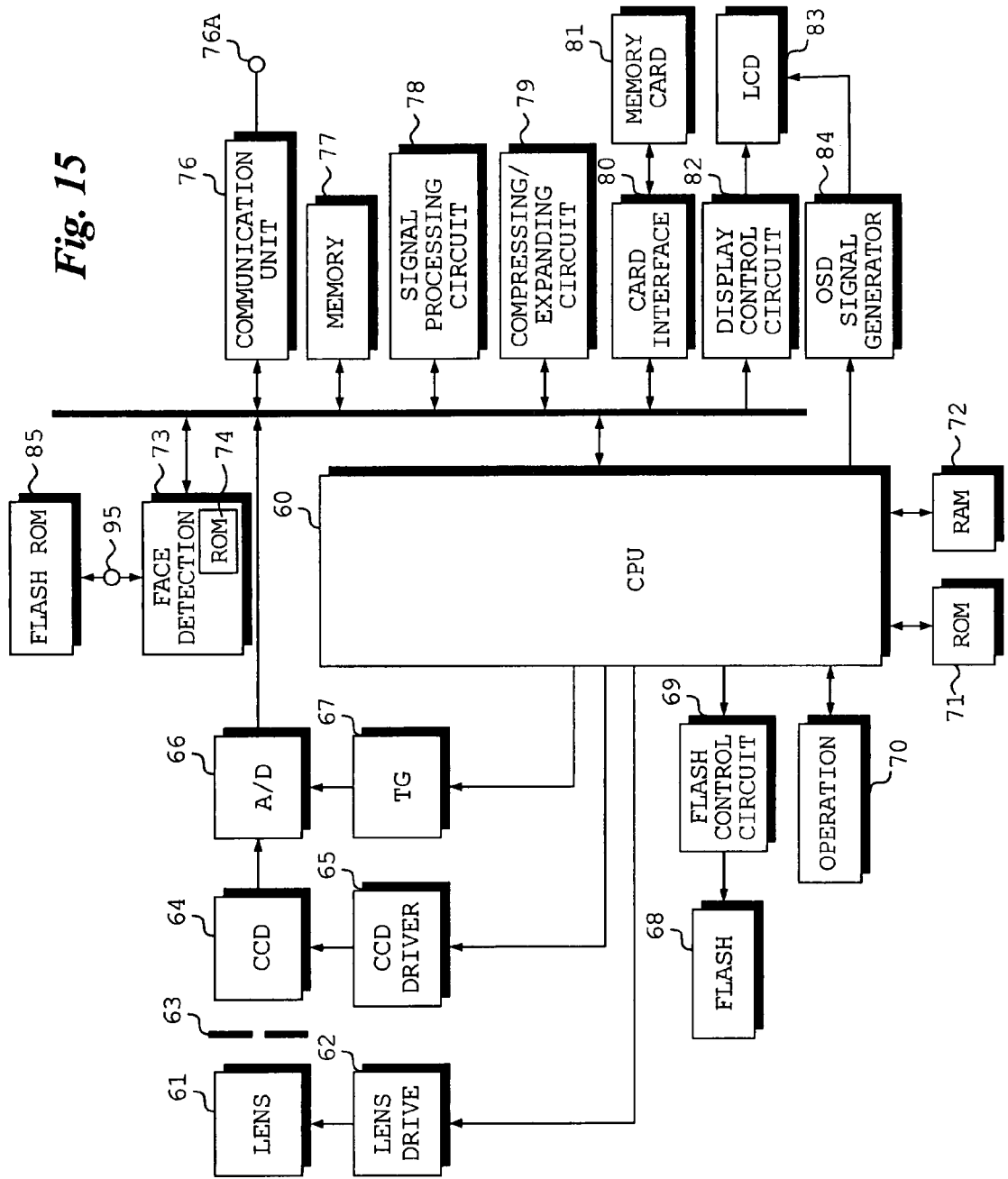
FIG. 15 is a block diagram illustrating the electrical structure of a digital still camera.
Figure 16:
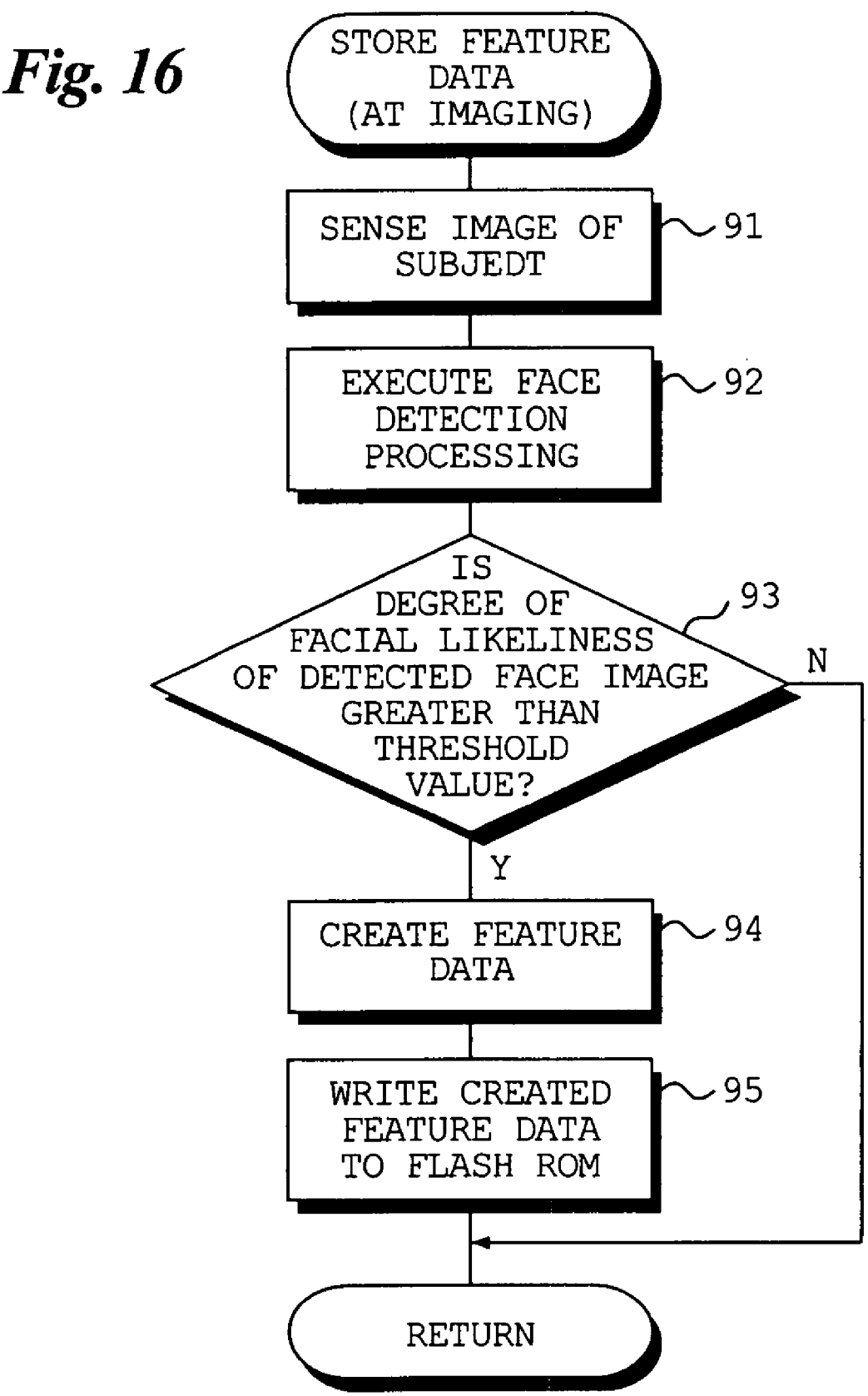
FIG. 16 is a flowchart illustrating processing for storing feature data.
Figure 17:
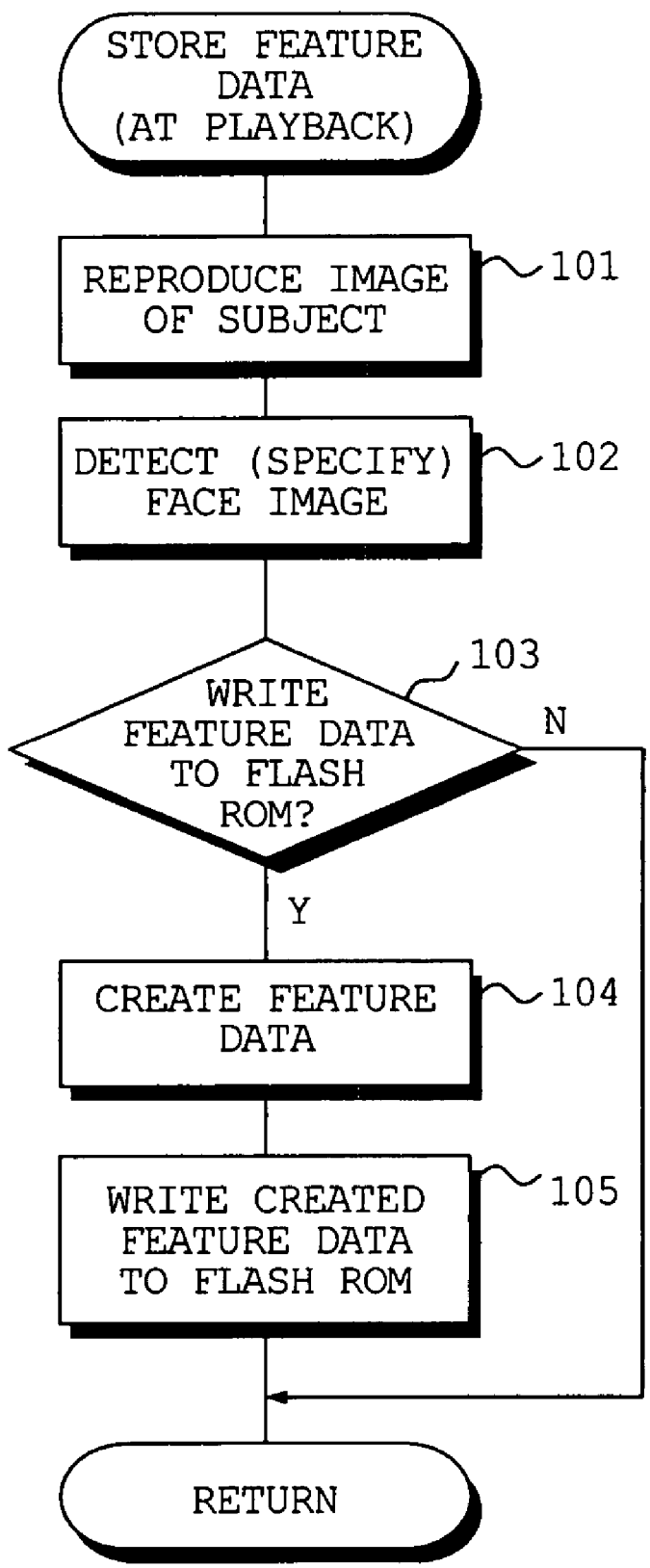
FIG. 17 is a flowchart illustrating processing for storing feature data.

FIGS. 15 to 17 illustrate another embodiment. This is an embodiment for a case where face-image detection processing is applied to a digital still camera.

FIG. 15 is a block diagram illustrating the electrical structure of a digital still camera.

The operation of the overall digital still camera is controlled by a CPU 60.

The digital still camera includes an operating unit 70 having various buttons such as a two-stroke shutter-release button, a mode setting dial and a menu button, etc. An operating signal that is output from the operating device 15 is input to the CPU 60. Connected to the CPU 60 are a ROM 71 in which the operating program of the digital still camera and other necessary data have been stored, and a RAM 72 for storing data temporarily.

The digital still camera is further provided with a flash light-emission unit 68 for flash photography. The flash light-emission unit 68 has its light emission controlled by a flash control circuit 69 controlled by the CPU 60.

An imaging lens 61 and an iris 63 are provided in front of a CCD 64. The imaging lens 61 has its position controlled by a lens driving circuit 62, which is controlled by the CPU 60, in such a manner that the image of the subject is formed on the photoreceptor surface of the CCD 64. The iris 63 has its f-stop value controlled by an iris driving circuit (not shown), which is controlled by the CPU 60, in such a manner that an appropriate exposure is obtained.

If the image sensing mode is set by the mode setting switch, the image of the subject is sensed by the CCD 64. By driving the CCD 64 using a CCD driver 65, the CCD 64 outputs a video signal representing the image of the subject. The video signal is converted to digital image data in an analog/digital converting circuit 66 that operates based upon clock pulses supplied by a timing generator 67.

The image data obtained by the conversion in the analog/digital converting circuit 66 is input to a signal processing circuit 78. The latter applies corrections such as an offset correction, gain correction and gamma correction. The image data that has been output from the signal processing circuit 78 is input to a display control circuit 82. By controlling a liquid crystal display unit 83 using the display control circuit 82, the image of the subject is displayed on the display screen of the liquid crystal display unit 83.

In the digital still camera according to this embodiment, the image of a face is detected from within the image of the subject. A signal that has been output from a circuit 84 that generates an on-screen-device (OSD) signal is applied to the liquid crystal display unit 83, whereby a border of the detected face image is displayed so as to overlap the image of the subject being displayed on the display screen of the liquid crystal display unit 83.

The digital still camera according to this embodiment incorporates a communication unit 76. A connection terminal 76A for connection to a personal computer or the like has been connected to the communication unit 76. As a result, the digital still camera and a personal computer, etc., can be connected.

If the shutter-release button is pressed through half its stroke, digital image data that has been obtained by conversion in the analog/digital converting circuit 66 in the manner described above is input to a face detecting apparatus 73. Incorporated within the face detecting apparatus 73 is a ROM 74 in which basic feature data have been stored in the manner described above. A flash ROM 85 has been connected to the face detecting apparatus 73 via a connection terminal 95. Optional feature data have been stored in the flash ROM 85 in the manner described above.

Using the basic feature data that have been stored in the ROM 74 (and, if necessary, using the optional feature data that have been stored in the ROM 85), the face detecting apparatus 73 detects the position of a face image from within the image of the subject represented by the entered digital image data. By applying the position of the detected face image to the OSD signal generating circuit 84, the border of the face is displayed on the image of the subject being displayed on the liquid crystal display unit 83, as mentioned above.

If the shutter-release button is pressed through its full stroke, the digital image data that has been obtained by conversion in the analog/digital converting circuit 66 in the manner described above is input also to the signal processing circuit 78. The latter applies corrections such as an offset correction, gain correction and gamma correction. When these corrections are carried in the signal processing circuit 78, the image data is applied to and stored temporarily in the memory 77. The image data that has been stored in the memory 77 is read out under the control of the CPU 60. The image data that has been read out is subjected to interpolation processing. Image data obtained by interpolation is again applied to and stored in the memory 77.

The interpolated image data is read out of the memory 77 and input to a compressing/expanding circuit 79. The interpolated image data is compressed in the compressing/expanding circuit 79. The compressed image data is applied to and recorded on a memory card 81 via a card interface 80.

If a playback mode is set by the mode setting switch, the compressed image data that has been recorded on the memory card 81 is read via the card interface 80. The read image data is expanded by the compressing/expanding circuit 79. The expanded image data is applied to the display control circuit 82, whereby the image of the subject represented by the image data that has been recorded on the memory card 81 is displayed on the display screen of the liquid crystal display unit 83.

The image data that has been read out of the memory card 81 and expanded is applied also to the face detecting apparatus 73. Face-image detection processing is executed in the face detecting apparatus 73 and data representing the position of the detected face image is obtained. The data representing the position of the face image is applied to the OSD signal generating circuit 84, whereby a border is displayed on the face-image portion of the subject image being displayed on the display screen of the liquid crystal display unit 83.

FIG. 16 is a flowchart illustrating processing for storing a feature when the image of a subject is sensed using the digital still camera.

The image sensing mode is set and the image of the subject is sensed (step 91). Face detection processing is executed based upon the image of the subject obtained by image sensing (step 92). In a case where a value representing the degree of facial likeliness of a face image in the face image detected by the face detection processing exceeds a prescribed threshold value ("YES" at step 93), feature data is created from the detected face image (step 94). The feature data is obtained by calculating pixel values at positions in the detected face image. It goes without saying that position is corrected in accordance with the size of the search area. The feature data created is written to the flash ROM 85 by the CPU 60 (step 95). If the value representing the degree of facial likeliness does not exceed the prescribed threshold value ("NO" at step 73), the processing of steps 94 and 95 is skipped.

Feature data (optional feature data) can be created utilizing the image of the subject obtained by image sensing and the created feature can be written to the flash ROM 85 to thereby enable the flash ROM 85 to be updated.

FIG. 17 is a flowchart illustrating processing for storing feature data at the time of playback.

Image data that has been recorded on a memory card is read out and the image of the subject is reproduced (step 101). The image of a face is detected from within the reproduced image of the subject (step 102). Of course, in a case where the user is capable of specifying a face image from within the image of a subject being displayed on the liquid crystal display unit 83, the face image may be specified by the user without face detection processing being executed. For example, if the display screen of the liquid crystal display unit 83 has been provided with a touch-sensitive panel, the face image can be specified utilizing the touch-sensitive panel or it may be so arranged that a cursor is displayed on the display screen and the face image is designated utilizing the cursor.

If a command for writing feature data to the flash ROM is applied from the operating unit 70 to the digital still camera ("YES" at step 103), then feature data is created from the detected face image (step 104). Data representing the created feature data is written to the flash ROM 85 (step 105).

Figure 18:
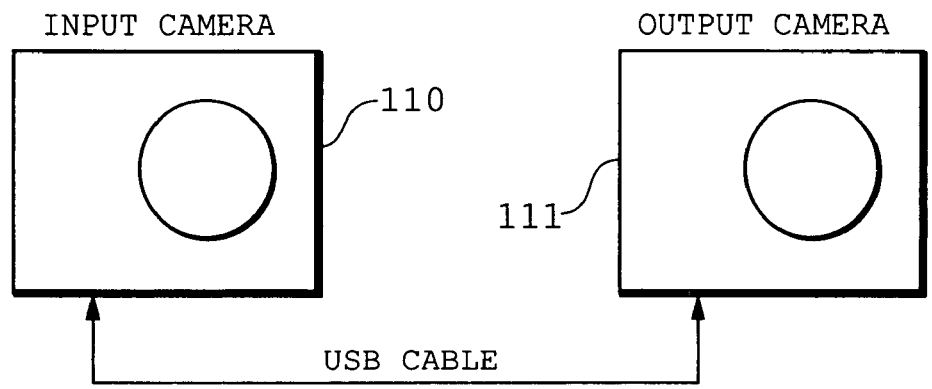
FIG. 18 illustrates digital still cameras connected by a USB cable.
Figure 19:
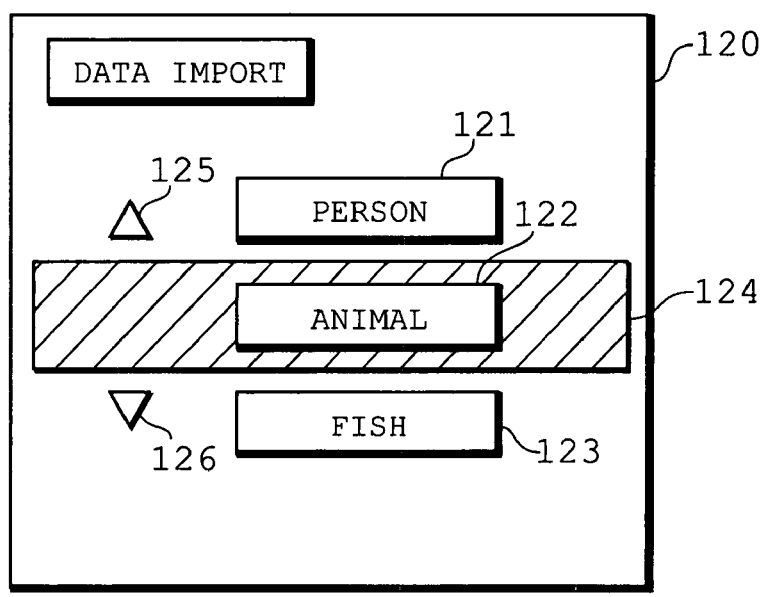
FIG. 19 illustrates an example of a display screen of the digital still camera.

FIGS. 18 and 19 illustrate a further embodiment. Data representing features (feature values) that have been written to the ROM or flash ROM of one digital still camera is written to the flash ROM of another digital still camera.

With reference to FIG. 18, the digital still camera on the output side (the output camera is one digital still camera) 111 and the digital still camera on the input side (the input camera is the other digital still camera) are connected by a USB cable. The USB cable is connected to the connection terminal 76A, as described above, whereby the input camera 110 and the output camera 111 are connected.

FIG. 19 illustrates an example of a display screen of the input camera 110.

If a set-up menu is displayed using the mode switch included in the operating unit 70, the set-up menu will include a data import menu item. If the data import menu item is selected, the data import image illustrated in FIG. 19 appears.

An area 121 in which characters reading "PERSON" are being displayed, an area 122 in which characters reading "ANIMAL" are being displayed and an area 123 in which characters reading "FISH" are being displayed are displayed in the data import image along the vertical direction. A cursor 124 is displayed in such a manner that it may be moved up and down between these areas. An up arrow 125 is displayed on the upper left side of the cursor 124, and a down arrow 126 is displayed on the lower left side of the cursor 124. By selecting any one of the areas 121 to 123, optional feature data to be input is decided. A data output image corresponding to the data import image shown in FIG. 19 is displayed on the output camera 111 as well. It is possible to make a selection for outputting optional feature data of the face image of a person, a selection for outputting optional feature data of the face image of an animal and a selection for outputting the optional feature data of the face image of a fish.

After the types of optional features to be sent and received coincide in both the input camera 110 and output camera 111, a decide button on the output camera 111 is pressed. When this is done, optional feature data (optional feature values) corresponding to the selected type is read out from among the optional feature data that has been written to the output camera 111, and this data is input to the input camera 110. The optional feature data that has been written to the output camera 111 is written to the flash ROM of the input camera 110.

Figure 20:
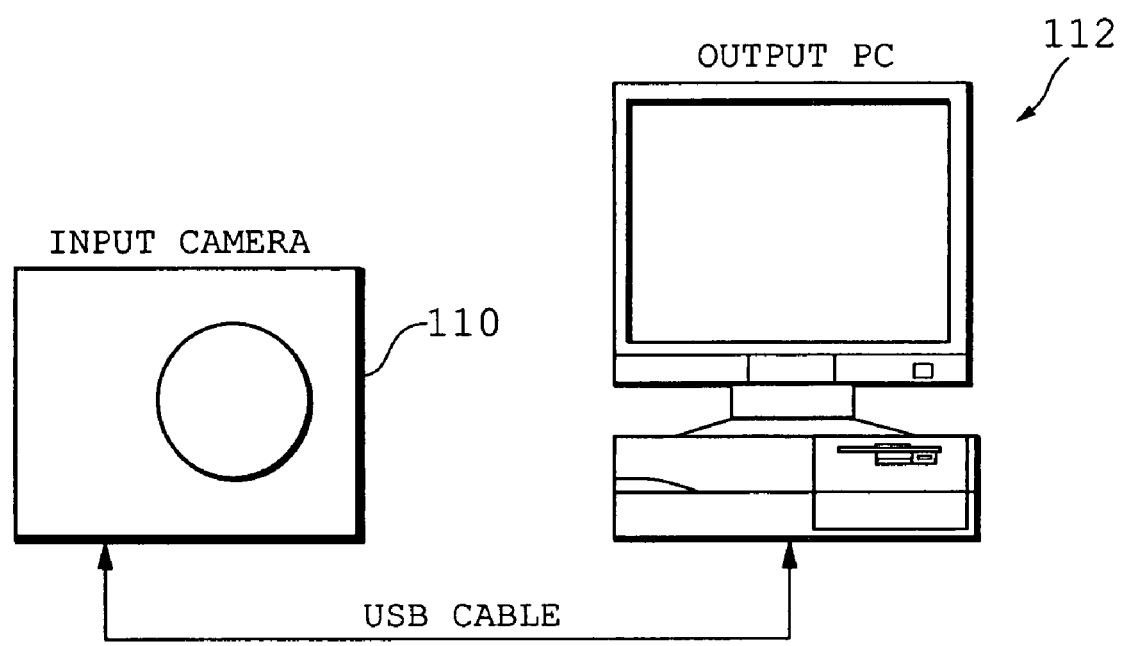
FIG. 20 illustrates a digital still camera and a personal computer connected by a USB cable.

FIG. 20 illustrates a modification and shows the manner in which the input camera 110 and an output personal computer (PC) 112 are connected by a USB cable. Thus it will be understood that in a manner similar to that described above, optional feature data that has been stored in a personal computer can be written to the input camera 110 using not only a digital still camera but also the personal computer 112.

Figure 21:
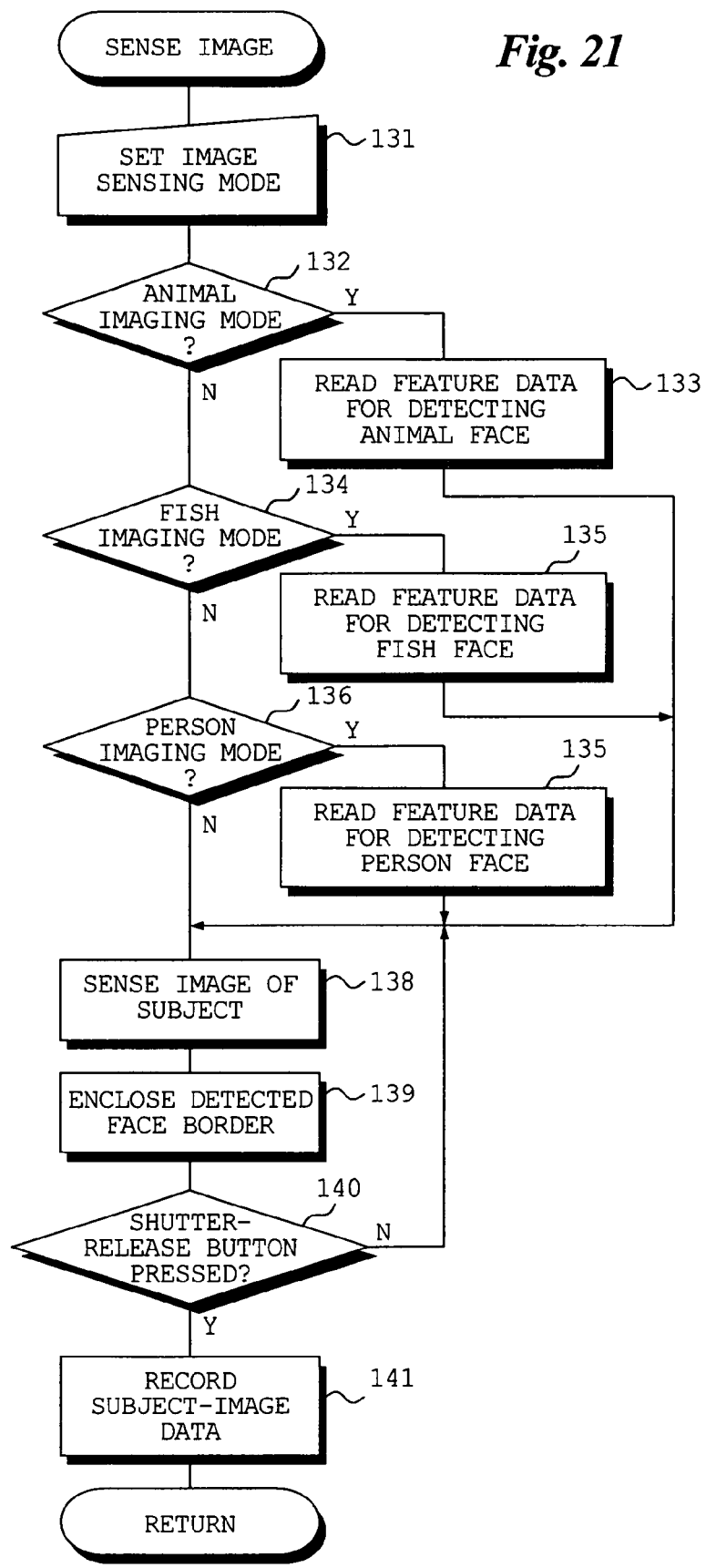
FIG. 21 is a flowchart illustrating processing for sensing an image.

FIG. 21 is a flowchart illustrating processing for image sensing performed by a digital still camera.

It is assumed here that feature data has been stored in the digital still camera, namely feature data for detecting the face image of a person, feature data for detecting the face image of an animal and feature data for detecting the face image of a fish. It is also assumed that image sensing modes that can be set are a mode for sensing the image of an animal, a mode for sensing the image of a fish and a mode for sensing the image of a person.

The image sensing mode is set by the user of the digital still camera (step 131). If the mode for sensing an animal is set ("YES" at step 132), then feature data for detecting the face image of an animal is read from the flash ROM (step 133). If the mode for sensing a fish is set ("YES" at step 134), then feature data for detecting the face image of a fish is read from the flash ROM (step 135). If the mode for sensing a person is set ("YES" at step 136), then feature data for detecting the face image of a person is read from the flash ROM (step 137).

If the image of a subject is sensed (step 138), face-image detection processing is executed using the read feature data. If a face image is detected, then the image of the subject is displayed on the display screen with the detected face image enclosed by a border (step 139).

If the shutter-release button is pressed ("YES" at step 140), then subject-image data obtained by image sensing is recorded on a memory card (step 141).

Feature data conforming to the image sensing mode is read out and a face image is detected from within the image of the subject using the feature data that has been read out. This makes it possible to detect a face image conforming to the target of photography. In addition, detection accuracy is improved. Image processing conforming to the detected face image (e.g., image processing suited to the face image of a person, image processing suited to the face image of an animal and image processing suited to the face image of a fish) can be implemented.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for detecting a target image, comprising:
a first memory for storing data representing a first feature utilized in order to detect a target image from within the image of a subject;
a reading device for reading data representing a second feature, which is utilized in order to detect the target image, from a second memory that stores the data representing the second feature;

a first target-image detecting circuit for detecting the target image from within the image of the subject, which is applied thereto, using the data representing the first feature that has been stored in said first memory;

a second target-image detecting circuit for detecting the target image from within the image of the subject, which is applied thereto, using the data representing the second feature that has been read by said reading device;

a write mode setting device configured to set a first write mode in which data representing a feature of an image of a human face is written to said second memory as data representing the second feature, and configured to set a second write mode in which data representing a feature of an image of a specific target other than a human being is written to said second memory as data representing the second feature;

a feature-data input device for inputting data representing the feature of the image of a human face and data representing the feature of the image of the specific target; and a write control device for, in response to setting of the first write mode by said write mode setting device, writing the data representing the feature of the image of a human face, which as been input from said feature-data input device, to said second memory, and in response to setting of the second write mode by said write mode setting device, writing the data representing the feature of the image of the specific target, which has been input from said feature-data input device, to said second memory.

2. The apparatus according to claim 1, wherein said first memory is a non-rewritable memory.

3. The apparatus according to claim 1, wherein said second memory is a rewritable memory.

4. The apparatus according to claim 1, wherein said second memory is connected to said reading device.

5. The apparatus according to claim 4, wherein said first memory stores, as the first feature, data representing the features of images that include an upright image among images of faces from the front of a human being; and said second memory stores, as the second feature, data representing a feature of at least one image of an inclined image other than an upright image among images of faces from the front of a human being, and an image of a specific target other than a human being.

6. The apparatus according to claim 1, further comprising an image sensing device for sensing the image of a subject and outputting image data representing the image of the subject;

wherein said first target-image detecting circuit and said second target-image detecting circuit detect the target image from within the image of a subject represented by image data that has been output from said image sensing device.

7. The apparatus according to claim 6, wherein said second memory, which is rewritable, is connected to said reading device; and said apparatus further comprises:

a feature extracting device for extracting a feature of the target image from the target image detected by said target-image detecting circuit; and a write control device for writing data, which represents the feature extracted by said feature extracting device, to said second memory as data representing the second feature.

8. The apparatus according to claim 1, wherein said second memory, which is rewritable, is connected to said reading device; and said apparatus further comprises:

a reproducing circuit for reproducing the image of a subject;

a feature extracting device for extracting a feature of the target image from the target image contained in the image of the subject reproduced by said reproducing circuit; and a write control device for writing data, which represents the feature extracted by said feature extracting device, to said second memory as data representing the second feature.

9. The apparatus according to claim 1, wherein said second memory, which is rewritable, is connected to said reading device; and said apparatus further comprises:

a feature-data input device for inputting data representing the second feature; and a write control device for writing data, which represents the second feature that has been input from said feature-data input device, to said second memory.

10. The apparatus according to claim 1, wherein data representing the first feature utilized in order to detect the image of a human face as the target image is stored in said first memory;

said second memory, which has stored data representing the second feature utilized in order to detect the image of a specific target other than a human being as the target image, is connected to said reading device; and said apparatus further comprises a detection mode setting device for setting a mode in which the image of a human face is detected or a mode in which the image of a specific target other than a human being is detected;

in response to setting by said detection mode setting device of the mode in which the image of a human face is detected, said first target-image detecting circuit detecting the image of human face from within the applied image of the subject using the data representing the first feature that has been stored in said first memory;

in response to setting by said detection mode setting device of the detection mode in which the image of a specific target other than a person is detected, said second target-image detecting circuit detecting the image of the specific target from within the applied image of the subject using the data representing the second feature that has been stored in said second memory.

11. A method of controlling an apparatus for detecting a target image, comprising the steps of:

storing data, which represents a first feature utilized in order to detect a target image from within the image of a subject, in a first memory;

reading data representing a second feature, which is utilized in order to detect the target image, from a second memory that stores the data representing the second feature;

detecting the target image from within the applied image of the subject using the data representing the first feature that has been stored in the first memory; and detecting the target image from within the applied image of the subject using the data representing the second feature that has been read; and setting a first write mode in which data representing a feature of an image of a human face is written to the second memory as data representing the second feature, and setting a second write mode in which data representing a feature of an image of a specific target other than a human being is written to the second memory as data representing the second feature; and inputting data representing the feature of the image of a human face and data representing the feature of the image of the specific target;

wherein in response to setting of the first write mode, writing the data representing the feature of the image of a human face, which has been input to the second memory, and wherein in response to setting of the second write mode, writing the data representing the feature of the image of the specific target, which has been input, to the second memory.

* * * * *